United States Patent
Augustin

(10) Patent No.: US 12,089,761 B2
(45) Date of Patent: Sep. 17, 2024

(54) UNDER SLEEPER PAD

(71) Applicant: Getzner Werkstoffe Holding GmbH, Burs (AT)

(72) Inventor: Andreas Augustin, Nuziders (AT)

(73) Assignee: Getzner Werkstoffe Holding GmbH, Bürs (AT)

(*) Notice: Subject to any disclaimer, the term of this patent is extended or adjusted under 35 U.S.C. 154(b) by 1056 days.

(21) Appl. No.: 16/967,529

(22) PCT Filed: Jan. 17, 2019

(86) PCT No.: PCT/AT2019/000001
§ 371 (c)(1),
(2) Date: Aug. 5, 2020

(87) PCT Pub. No.: WO2019/157540
PCT Pub. Date: Aug. 22, 2019

(65) Prior Publication Data
US 2021/0212491 A1 Jul. 15, 2021

(30) Foreign Application Priority Data
Feb. 14, 2018 (AT) .................... A 38/2018

(51) Int. Cl.
*A47G 27/02* (2006.01)
*B32B 5/02* (2006.01)
*B32B 25/10* (2006.01)

(52) U.S. Cl.
CPC .......... *A47G 27/0212* (2013.01); *B32B 5/022* (2013.01); *B32B 25/10* (2013.01); *B32B 2471/04* (2013.01)

(58) Field of Classification Search
CPC .... A47G 27/0212; B32B 5/022; B32B 25/10; B32B 2471/04; E01B 2204/01; E01B 3/46
(Continued)

(56) References Cited
U.S. PATENT DOCUMENTS 4,145,318 A * 3/1979 Ohashi ............... C08G 18/6622
521/903
4,648,554 A * 3/1987 McQueen ............... E01B 9/686
238/382
(Continued)

FOREIGN PATENT DOCUMENTS

AT  505117  10/2008
AT  10905   12/2009
(Continued)

OTHER PUBLICATIONS

Trackelast Specialist Rail Solutions the performance solution provider, 20 pages, www.tiflex.co.uk, admitted prior art, Jan. 1, 2018.
(Continued)

*Primary Examiner* — David R Hare
*Assistant Examiner* — Luke Hall
(74) *Attorney, Agent, or Firm* — Volpe Koenig

(57) ABSTRACT

An under sleeper pad (1) to be fastened to an underside (3) of a sleeper (4), on the opposite side from the tracks (2). The under sleeper pad (1) has at least one elastic layer (5) having cork grains (6) of a cork granulate distributed throughout. In addition, the elastic layer (5) has at least one cellular synthetic elastomer (7).

13 Claims, 1 Drawing Sheet

(58) Field of Classification Search
USPC .................................................. 5/420
See application file for complete search history.

(56) References Cited

U.S. PATENT DOCUMENTS

| | | | |
|---|---|---|---|
| 4,652,495 A | | 3/1987 | Sato et al. |
| 5,543,470 A | * | 8/1996 | Nakata .................... C08K 3/06 |
| | | | 524/495 |
| 2004/0121096 A1 | * | 6/2004 | Asmussen ............. E01B 19/003 |
| | | | 428/34.1 |
| 2007/0172590 A1 | * | 7/2007 | Hoffmann .......... C08G 18/4837 |
| | | | 427/212 |
| 2007/0270540 A1 | * | 11/2007 | Kanae ................. C08L 23/0815 |
| | | | 524/515 |
| 2013/0062423 A1 | * | 3/2013 | Zhang .................... C08G 18/10 |
| | | | 238/2 |
| 2014/0300015 A1 | * | 10/2014 | Erwe ....................... E01B 27/02 |
| | | | 264/35 |
| 2014/0335321 A1 | * | 11/2014 | Reisman ................ B32B 38/06 |
| | | | 264/296 |

FOREIGN PATENT DOCUMENTS

| | | | | |
|---|---|---|---|---|
| AU | 2009295241 | | 3/2010 | |
| CN | 2161637 | | 4/1994 | |
| CN | 101058629 A | | 10/2007 | |
| CN | 101135132 A | | 3/2008 | |
| CN | 101608056 A | | 12/2009 | |
| CN | 101618593 A | | 1/2010 | |
| CN | 107002371 | | 8/2017 | |
| DE | 3602669 | | 7/1987 | |
| DE | 19536010 | | 4/1997 | |
| EP | 404756 | | 5/1993 | |
| EP | 0569867 | | 11/1993 | |
| EP | 0795645 | | 9/1997 | |
| EP | 2107074 | | 10/2009 | |
| EP | 2946036 | | 2/2017 | |
| GB | 2500660 | | 10/2013 | |
| JP | H0884653 A | * | 9/1994 | ............. A47G 27/02 |
| JP | 20110109366 A | * | 9/2011 | ............... E01B 2/00 |
| KR | 20110108516 | | 10/2011 | |
| KR | 20110109366 A | * | 10/2011 | ............... E01B 9/98 |
| WO | 2008112065 | | 10/2008 | |
| WO | 2011151389 | | 12/2011 | |
| WO | 2014110608 | | 7/2014 | |

OTHER PUBLICATIONS

Acousticork MS-R2 Material Data Sheet, Amorim Cork Composites, Amorimcorkcomposites.com, Feb. 2017.
Railway Systems, Material for Railway Systems, 5 pages, Jan. 31, 2018.
Translated Search Report dated Jul. 7, 2022 for Chinese Patent Application No. 201980013575.8.
Dold et al., "Understanding the life of ballast mats." Railway Gazette international 169 (2013).
Getzner Werkstoffe GmbH, "Case Study: 30 years of vibration protection for the Philharmonic Hall Gasteig, Munich," (Jan. 29, 2019).
Egger et al., "Quality control measurement of a MSS after 30 years of operation," European Railway Review (Nov. 6, 2016).

* cited by examiner

UNDER SLEEPER PAD

TECHNICAL FIELD

The present invention relates to an under sleeper pad for fastening to a bottom side, situated opposite the rails, of a track sleeper, wherein the under sleeper pad has at least one elastic layer with cork grains of a cork granulate that are arranged in a distributed manner therein.

BACKGROUND

For the purposes of vibration damping and ballast protection, under sleeper pads are arranged on or fastened to the bottom sides of track sleepers which carry the rails. Nowadays, these track sleepers consist frequently of concrete. For the purpose of vibration damping, under sleeper pads have at least one elastic layer. The prior art has disclosed a wide variety of materials and material mixtures for forming this elastic layer. Inter alia, it is prior art to use cork grains in the form of a cork granulate for the formation of the elastic layer of the under sleeper pad. For this purpose, waste resulting from the processing of cork is generally used.

SUMMARY

It is an object of the invention to improve under sleeper pads of the generic type, in which the elastic layer comprises cork grains of a cork granulate, in terms of their properties, in particular for the purpose of vibration damping.

For this purpose, the invention provides that the elastic layer in addition comprises at least one cellular synthetic elastomer.

The invention takes into consideration that the cork grains of the cork granulate have a relatively high stiffness or plasticity and thus assume substantially the carrying function in the elastic layer. However, in order in addition to also improve the elasticity necessary for the vibration damping, according to the invention in addition at least one cellular synthetic elastomer is used which is arranged preferably between the cork grains, in order thus to optimize the elastic properties of the elastic layer for application in an under sleeper pad. In this way, an under sleeper pad can be provided which on the one hand has optimized elastic properties for this specific use of vibration damping under track sleepers and therefore very good vibration damping, and on the other hand however also provides the necessary stability and in addition can also still be produced cost-effectively, since waste products from another cork processing operation can be used as cork grains of the cork granulate. In addition, good ballast protection is also achieved by under sleeper pads according to the invention.

The elastic layer of the under sleeper pad according to the invention thus consists of a mixture of a natural material in the form of the cork grains and an artificially or synthetically produced material in the form of the at least one cellular synthetic elastomer. The word "cellular" means here that the synthetic elastomer is a body with gas or air pockets. Reference could also be made to a foam or a foamed material. The word "synthetic" means that the elastomer is produced artificially, that is to say is a plastic and not a pure natural product. An elastomer is a dimensionally stable but elastically deformable material which can be elastically deformed under tensile and/or pressure loading and then, after the loading has ended, however, at least predominantly returns to its original undeformed shape again. The cellular synthetic elastomer could thus also be referred to as an elastic plastic which is porous or has gas pockets and/or air pockets. Since the elastic layer also has plastic properties, it could also be referred to as an elastoplastic layer.

Particularly preferred variants of the invention provide that the cellular synthetic elastomer as the solid matter of the elastomer comprises or consists of polyurethane. In this case, reference could thus also be made to a cellular polyurethane. As an alternative, the solid matter of the cellular synthetic elastomer can however also be styrene-butadiene rubber or ethylene-vinyl acetate copolymer or ethylene-propylene-diene rubber or chloroprene rubber or silicone or polyisoprene. Mixtures of these elastomers are also possible for forming the cellular synthetic elastomer of the elastic layer.

The cork grains of the cork granulate and the at least one cellular synthetic elastomer are favorably more or less evenly distributed and/or arranged as a heterogenous mixture in the elastic layer. Both the cork grains and the cellular synthetic elastomer can generally be perceived with the naked eye. Reference could also be made to a conglomerate or to a mixture of these two substances.

In a first embodiment, the cork grains, arranged in a distributed manner in the elastic layer, of the cork granulate are embedded in a matrix comprised of the cellular synthetic elastomer. In other words, it can consequently thus be provided that the cellular synthetic elastomer in the elastic layer forms a matrix, or in other words a base skeleton, in which the cork grains, arranged in a distributed manner, of the cork granulate are embedded, wherein the cellular synthetic elastomer connects the cork grains to one another.

As an alternative, it can be provided that the at least one cellular synthetic elastomer in the elastic layer is also in the form of grains arranged in a distributed manner. These grains comprised of the cellular synthetic elastomer and the grains of the cork granulate can then be connected to one another by means of at least one binder. It can thus be provided that the cellular synthetic elastomer in the elastic layer is in the form of grains which are arranged in a distributed manner and comprised of the cellular synthetic elastomer, wherein the grains comprised of the cellular synthetic elastomer and the cork grains of the cork granulate are connected to one another by means of at least one binder.

In all these embodiments, it is favorably provided that the cork grains of the cork granulate in the elastic layer are arranged in a uniformly distributed manner. The same also applies favorably to the grains comprised of the cellular synthetic elastomer, if present. For example, a single-component polyurethane binder, such as for example isocyanate, can be used as the binder for interconnecting the cork grains and the grains comprised of the cellular synthetic elastomer. To mention a further example, it can however also be a two-component polyurethane binder or other binders or mixtures of these binders. As an alternative, it is however also possible that the binder itself is a cellular synthetic elastomer in which grains comprised of the or another cellular synthetic elastomer and the cork grains are then embedded.

In the case of the expression "the grain", it should be noted that this expression should first be understood as a small individual body of a granulate. The grain could also be referred to as flock, small pieces, particles or the like. The expression "the grain" still does not say anything about its size and form. The cork grains of the cork granulate preferably have a grain size of 0.1 mm to 10 mm, preferably of 0.5 mm to 8 mm. The grains comprised of the cellular synthetic elastomer, if present, preferably have a grain size of 1 mm to 20 mm, preferably of 1 mm to 12 mm. In the context of the invention, a granulate is generally understood to be a substance which is comprised of a multiplicity of grains. This thus involves an accumulation of individual grains which can be connected to one another by suitable measures. In this context, the grains comprised of the cellular synthetic elastomer could thus also be referred to as a cellular synthetic elastomer granulate. Regardless of the specific embodiment, the cellular synthetic elastomer favorably has a porosity in the range of 10% to 90%, preferably in the range of 30% to 70%. The density of the cellular synthetic elastomer is favorably, in turn regardless of the respective embodiment, in the range of 200 kg/m³ (kilograms per cubic meter) to 1 000 kg/m³, preferably in the range of 300 kg/m³ to 800 kg/m³.

It is particularly preferably provided that the cellular synthetic elastomer has a so-called compression set of at most 10%. The compression set here is a parameter which describes the extent to which the elastomer returns back again to its original shape after loading or how much plastic deformation remains after loading. The compression set can be determined according to DIN EN ISO 1856:2000+A1: 2007 by Method B.

The thickness of the elastic layer is favorably in the range of 5 mm (millimeters) to 20 mm, particularly preferably in the range of 5 mm to 15 mm.

In order to connect the under sleeper pad to the track sleeper, the under sleeper pad favorably has a connecting layer on the top side, provided for connection to the track sleeper, of the under sleeper pad. This can be random fiber layers known per se or other layers into which the material, that is to say in particular the concrete, of a track sleeper can penetrate during the casting of the track sleeper. The connecting layer of under sleeper pads according to the invention is particularly preferably a flock layer, such as is known per se from EP 2 946 036 B1.

The under sleeper pad preferably has a protective layer on the base side, facing the underlying surface in the operating position, of the under sleeper pad. This is favorable in particular whenever the underlying surface, on which the under sleeper pad comes to rest, is a ballast bed. This protective layer makes it possible on the one hand to improve the transverse displacement resistance and on the other hand to avoid undesired destruction of the under sleeper pad as a result of ballast penetrating into it. It preferably involves a textile protective layer. Geotextiles which are known per se can be used. The protective layer is preferably a nonwoven layer. The thickness of the protective layer is favorably between 1 mm and 5 mm, particularly preferably between 1 mm and 3 mm.

In addition to the under sleeper pad per se, the invention also relates to an arrangement with a track sleeper and an under sleeper pad according to the invention, wherein the under sleeper pad is fastened to the bottom side, situated opposite the rails, of the track sleeper. The under sleeper pad with its connecting layer is preferably cast into the track sleeper. Such an arrangement could also be referred to as a composite of a track sleeper and an under sleeper pad according to the invention. The track sleeper preferably consists of concrete or has at least one concrete layer. As an alternative, the track sleeper can also consist of wood, plastic or steel, wherein then the under sleeper pad can be fastened to the track sleeper, for example by adhesive bonding. The adhesive bonding is naturally also possible in the case of track sleepers comprised of concrete. The track sleeper could also be referred to as a railroad sleeper or simply merely as a sleeper. In any case, it is the body that generally is laid transversely or orthogonally with respect to the rails and to which the rails are fastened.

BRIEF DESCRIPTION OF THE DRAWINGS

Further features and details are explained below with reference to the description of the figures. In the figures.

DETAILED DESCRIPTION

Figure 1:
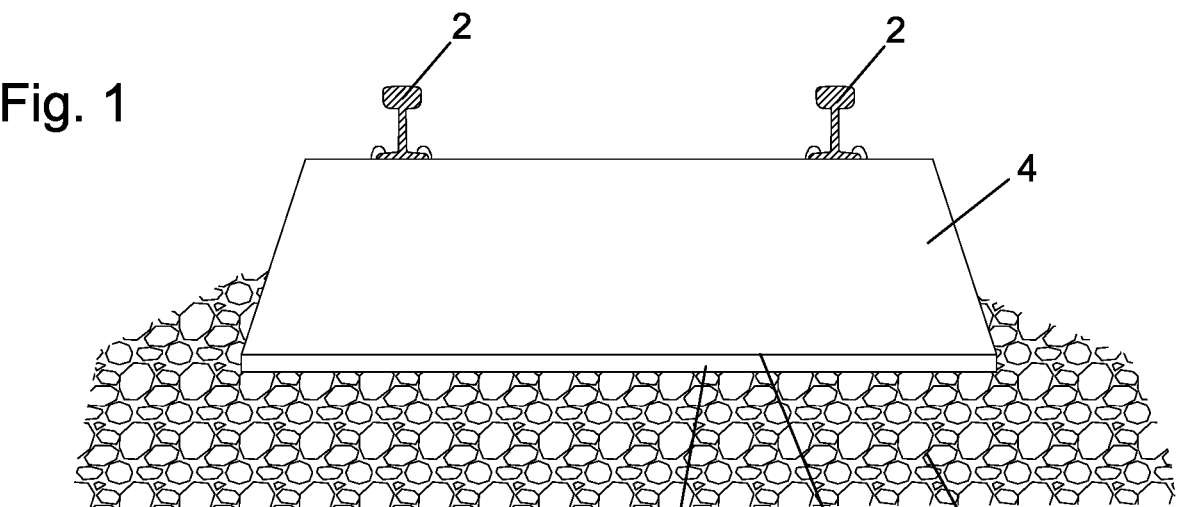
FIG. 1 shows a schematic illustration of a track sleeper with an under sleeper pad arranged thereon.

FIG. 1 shows an arrangement known per se of a track sleeper 4, to the bottom side 3, situated opposite the rails 2, of which is fastened an under sleeper pad 1. In the exemplary embodiment shown according to FIG. 1, the track sleeper 4 lies on a ballast bed 14 with the under sleeper pad 1 interposed. Naturally, the under sleeper pad 1 could however also rest on a solid underlying surface, that is to say on a so-called solid trackway such as for example a concrete slab or the like. This is known per se in the prior art and does not have to be explained further.

Figure 2:
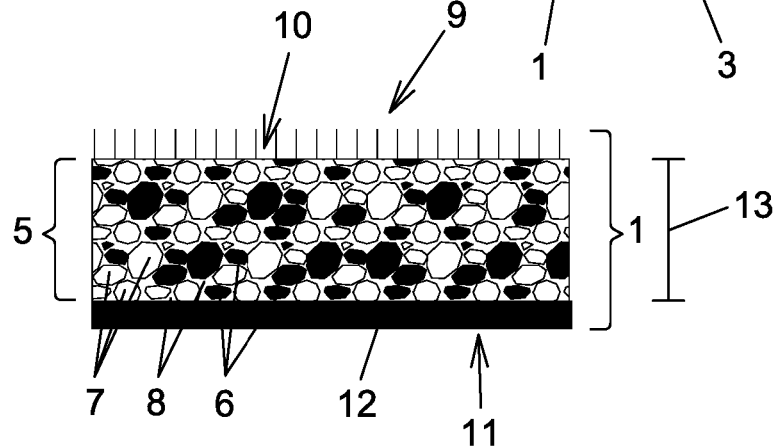
FIG. 2 shows a portion of the under sleeper pad per se according to the invention.

FIG. 2 now shows a schematic illustration of an under sleeper pad 1 according to the invention which, as illustrated in FIG. 1, is provided for arrangement on the bottom side 3 of the track sleeper 4. The exemplary embodiment shown here of an under sleeper pad 1 has, in addition to the elastic layer 5, a connecting layer 10 and a protective layer 12. The connecting layer 10 is located on the top side 9, provided for connection to the track sleeper 4, of the under sleeper pad 1. As already explained at the beginning, the connecting layer 10 is favorably a flock layer, the fibers of which are cast into the body of the track sleeper 4 during the casting of the track sleeper 4 which consists preferably of concrete, as a result of which an intimate connection of the under sleeper pad 1 to the track sleeper 4 can be ensured. Other connecting layers 10, which are known per se in the prior art, are naturally also conceivable on the top side 9 of the under sleeper pad 1. Located on the base side 11 or bottom side, which faces the underlying surface, that is to say for example the ballast bed 14 according to FIG. 1, in the operating position, of the under sleeper pad 1 in this example is the preferably textile protective layer 12. This particularly preferably involves a geotextile layer or a nonwoven layer. This on the one hand increases the transverse displacement resistance and on the other hand prevents the ballast of the ballast bed 14 from penetrating too deeply into or damaging the under sleeper pad 1.

The elastic layer 5 of the under sleeper pad 1 favorably has a thickness 13 with the values already mentioned at the beginning. Present in the elastic layer 5 are both cork grains 6 of a cork granulate and the cellular synthetic elastomer 7. These two components are preferably arranged in a uniformly distributed manner in the elastic layer 5.

Figure 3:
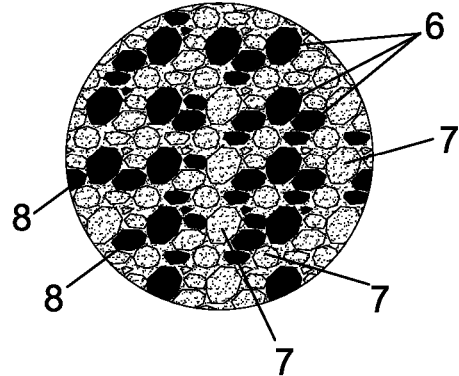
FIG. 3 shows an illustration of the structure of a first embodiment variant according to the invention of an elastic layer of the under sleeper pad.

FIG. 3 now shows, in a schematic and enlarged manner, a first variant in which the cellular synthetic elastomer 7 in the elastic layer 5 is in the form of grains, which are arranged in a distributed manner and comprised of the cellular synthetic elastomer 7, wherein the grains comprised of the cellular synthetic elastomer 7 and the cork grains 6 of the cork granulate are connected to one another by at least one binder 8. The materials already mentioned at the beginning, for example, come into consideration as the binder 8. In FIG. 3, the elastic layer 5 is thus based on a mixture of two granulates, wherein the one granulate is the cork grains 6, illustrated here as black grains, of the cork granulate and the other granulate is formed from grains comprised of the cellular synthetic elastomer 7, which is illustrated by dotted lines here. The dotted lines denote the porosity of the cellular synthetic elastomer 7.

Figure 4:
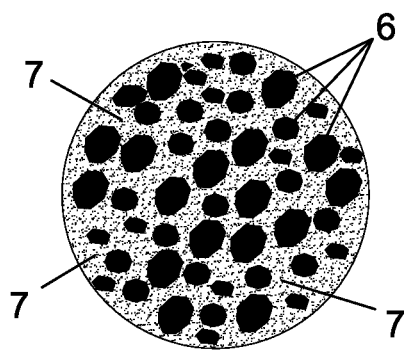
FIG. 4 shows the structure of a second embodiment variant of an elastic layer of an under sleeper pad according to the invention.

FIG. 4 shows a variant in which the cork grains 6 of the cork granulate are embedded in a matrix or a base skeleton, wherein this matrix or the base skeleton is formed from the cellular synthetic elastomer 7 of the elastic layer 5. The cork grains 6 of the cork granulate are arranged in a spatially distributed manner in this matrix. The matrix consisting of the cellular synthetic elastomer 7 connects the cork grains 6 to one another. As already explained at the beginning, mixed forms of the variants according to FIG. 3 and FIG. 4 can also be formed, in order to thus constitute under sleeper pads according to the invention. The binder 8 from FIG. 3 could thus also be a cellular synthetic elastomer.

In order to produce the elastic layer 5 of the under sleeper pad 1, as shown in a detail from FIG. 3, a favorable method provides that the cork grains 6 of the cork granulate and the grains comprised of the cellular synthetic elastomer 7 are mixed with the binder 8 and then the mixture thus produced is pressed into a hollow body, preferably with the addition of heat. The mixture, which includes the components mentioned and optionally additionally present fillers, can be pressed for example in a reaction vessel such as for example a cylinder. A pressure of a few bar, that is to say for example 2 to 3 bar excess pressure, is generally reached here. The temperature should be set depending on the material, favorably to 70° to 80° Celsius, wherein this is however not absolutely necessary. The binder 8, which is present for example in the form of a prepolymeric isocyanate, reacts fully here such that a cylinder comprised of cork grains 6, which are sufficiently fixedly connected to one another and comprised of cork granulate, and grains comprised of the cellular synthetic elastomer 7 is produced as a result. This cylinder can then be peeled or cut by way of methods known per se in order to produce the elastic layer 5 in the desired thickness.

As described above, FIG. 4 serves for the visualization of a second group of preferred exemplary embodiments according to the invention. In the case of these exemplary embodiments, the cellular synthetic elastomer 7 forms a matrix, that is to say a material skeleton, in which at least the cork grains 6 of the cork granulate are embedded. An additional binder 8 can be dispensed with in these embodiments due to the embedding of the grains or cork grains 6 into the matrix comprised of cellular synthetic elastomer 7. It is, however, also conceivable here, as already set out above, that in addition to the cork grains 6 of the cork granulate, grains comprised of cellular synthetic elastomer 7 are also embedded in the matrix comprised of cellular synthetic elastomer 7.

There are two different groups of methods for producing exemplary embodiments in which the cellular synthetic elastomer 7 forms a matrix. In the first, the cork grains 6 of the cork granulate, and optionally also the grains comprised of cellular synthetic elastomer 7, are mixed with a first component of the matrix material, for example a polyol component or a diol component or another OH group-containing component in the case of a polyurethane. This prefabricated mixture is then reacted by admixing a further component of the matrix material, for example isocyanate in the case of polyurethane.

The mold in which this reaction is carried out can already prescribe the final form of the elastic layer 5 of the under sleeper pad 1. It is however equally possible to produce a relatively large body in order to then produce the elastic layer 5 for example by peeling off or some other kind of cutting.

It is provided in a preferred second method for producing an elastic layer 5 of the under sleeper pad 1, in which a matrix comprised of cellular synthetic elastomer is used for the purpose of embedding the grains, in particular the cork grains 6, that the cork grains 6 of the cork granulate, and optionally also the grains comprised of cellular synthetic elastomer 7, are mixed with a ready-mixed reaction mixture of the cellular synthetic elastomer 7, and only then is the reaction mixture reacted fully to form the matrix comprised of cellular synthetic elastomer 7. This can take place for example by thermal activation, preferably in the temperature range between 70° and 80° mentioned further above. As an alternative, it is also possible to use a correspondingly slowly reacting reaction mixture so that there is enough time to intermix the grains mentioned. This then does not absolutely have to be thermally activated. In this latter method, it is also possible to carry out the reaction in a reaction vessel, which already prescribes the form of the final elastic layer 5. As an alternative, it is naturally also possible here to produce relatively large bodies in one piece in order then to produce the desired end product by peeling off or cutting. The optionally provided connecting layer 10 and/or the optionally provided protective layer 12 can be attached to the elastic layer 5 after or during the production of said elastic layer in a suitable manner by a procedure known per se.

LIST OF REFERENCE DESIGNATIONS

1 Under sleeper pad
2 Rail
3 Bottom side
4 Track sleeper
5 Elastic layer
6 Cork grain
7 Cellular synthetic elastomer
8 Binder
9 Top side
10 Connecting layer
11 Base side
12 Protective layer
13 Thickness
14 Ballast bed

The invention claimed is:

1. An under sleeper pad for fastening to a bottom side, situated opposite the rails, of a track sleeper, the under sleeper pad comprising at least one elastic layer including cork grains, arranged in a distributed manner therein, of a cork granulate, and at least one cellular synthetic elastomer, said at least one cellular synthetic elastomer is foamed.

2. The under sleeper pad as claimed in claim 1, wherein the cellular synthetic elastomer in the elastic layer forms a matrix in which the cork grains, arranged in a distributed manner, of the cork granulate are embedded, and the cellular synthetic elastomer connects the cork grains to one another.

3. The under sleeper pad as claimed in claim 1, wherein the cellular synthetic elastomer in the elastic layer is in the form of grains which are arranged in a distributed manner and comprised of the cellular synthetic elastomer, and the grains comprised of the cellular synthetic elastomer and the cork grains of the cork granulate are connected to one another by at least one binder.

4. The under sleeper pad as claimed in claim 1, wherein the cellular synthetic elastomer has a porosity in the range of 10% to 90%.

5. The under sleeper pad as claimed in claim 1, wherein the cellular synthetic elastomer has a density in the range of 200 kg/m$^3$ to 1000 kg/m$^3$.

6. The under sleeper pad as claimed in claim 1, wherein the cellular synthetic elastomer has a compression set of at most 10%.

7. The under sleeper pad as claimed in claim 1, wherein the cellular synthetic elastomer as the solid matter of the elastomer comprises at least one of polyurethane, styrene-butadiene rubber, ethylene-vinyl acetate copolymer, ethylene-propylene-diene rubber, chloroprene rubber, silicone, or polyisoprene.

8. The under sleeper pad as claimed in claim 1, further comprising a connecting layer on a top side, provided for connection to the track sleeper.

9. The under sleeper pad as claimed in claim 1, wherein the elastic layer has a thickness in the range of 5 mm to 20 mm.

10. An arrangement comprising a track sleeper and the under sleeper pad as claimed in claim 1, the under sleeper pad is fastened to a bottom side, situated opposite the rails, of the track sleeper.

11. The arrangement of claim 10, wherein the under sleeper pad includes a connecting layer that is cast into the track sleeper.

12. The under sleeper pad as claimed in claim 1, further comprising a textile protective layer on a base side, facing an underlying surface in an operating position, of the under sleeper pad.

13. The under sleeper pad as claimed in claim 12, wherein the textile protective layer is a nonwoven layer.

* * * * *